United States Patent [19]
Wiselogel

[11] Patent Number: 6,061,197
[45] Date of Patent: May 9, 2000

[54] ADAPTIVE CONTROL OF A WRITE INHIBIT SIGNAL IN A DISK DRIVE BASED ON ADAPTIVE TRACK PITCH

[75] Inventor: Mark Thomas Wiselogel, Morgan Hill, Calif.

[73] Assignee: Seagate Technology, Inc., Scotts Valley, Calif.

[21] Appl. No.: 08/831,856

[22] Filed: Apr. 2, 1997

Related U.S. Application Data

[60] Provisional application No. 60/032,053, Nov. 25, 1996.

[51] Int. Cl.⁷ .......................... G11B 15/04; G11B 21/02; G11B 5/596; G11B 19/04
[52] U.S. Cl. .......................... 360/60; 360/75; 360/77.08
[58] Field of Search ................................... 360/75, 77.08, 360/77.04, 60

[56] References Cited

U.S. PATENT DOCUMENTS

| | | | |
|---|---|---|---|
| 4,821,125 | 4/1989 | Christensen et al. | 360/31 |
| 5,553,086 | 9/1996 | Sompei et al. | 371/47.1 |
| 5,570,244 | 10/1996 | Wiselogel | 360/60 |
| 5,844,742 | 12/1998 | Yarmchuk et al. | 360/77.08 |

Primary Examiner—Thang V. Tran
Assistant Examiner—Regina Y. Neal
Attorney, Agent, or Firm—Jonathan E. Olson; Shawn B. Dempster; Edward P. Heller, III

[57] ABSTRACT

A method for adaptively controlling the write inhibit signal in a disk drive apparatus. The disk drive apparatus include magnetic disks manipulated such that the total space that is to be allocated for storing data has been measured and recorded such that the tracks for storing data have been servo written at a wider spacing than a nominal track spacing. The drive's operational circuitry includes access to modified write inhibit threshold data that is based on the drive's nominal design track misregistration allowance, plus any track width increase gained by adaptively controlling the track pitch. The modified write inhibit threshold essentially facilitates an acceptable delay in activating a write inhibit signal. The data tracks on each of the magnetic disks have been servo written utilizing the wider track spacing while maintaining the track misregistration allowance that corresponds to the nominal track spacing. The wider track spacing actually utilized effectively increases the off-track distance which a read/write head may travel prior to generation of a write inhibit signal.

15 Claims, 5 Drawing Sheets

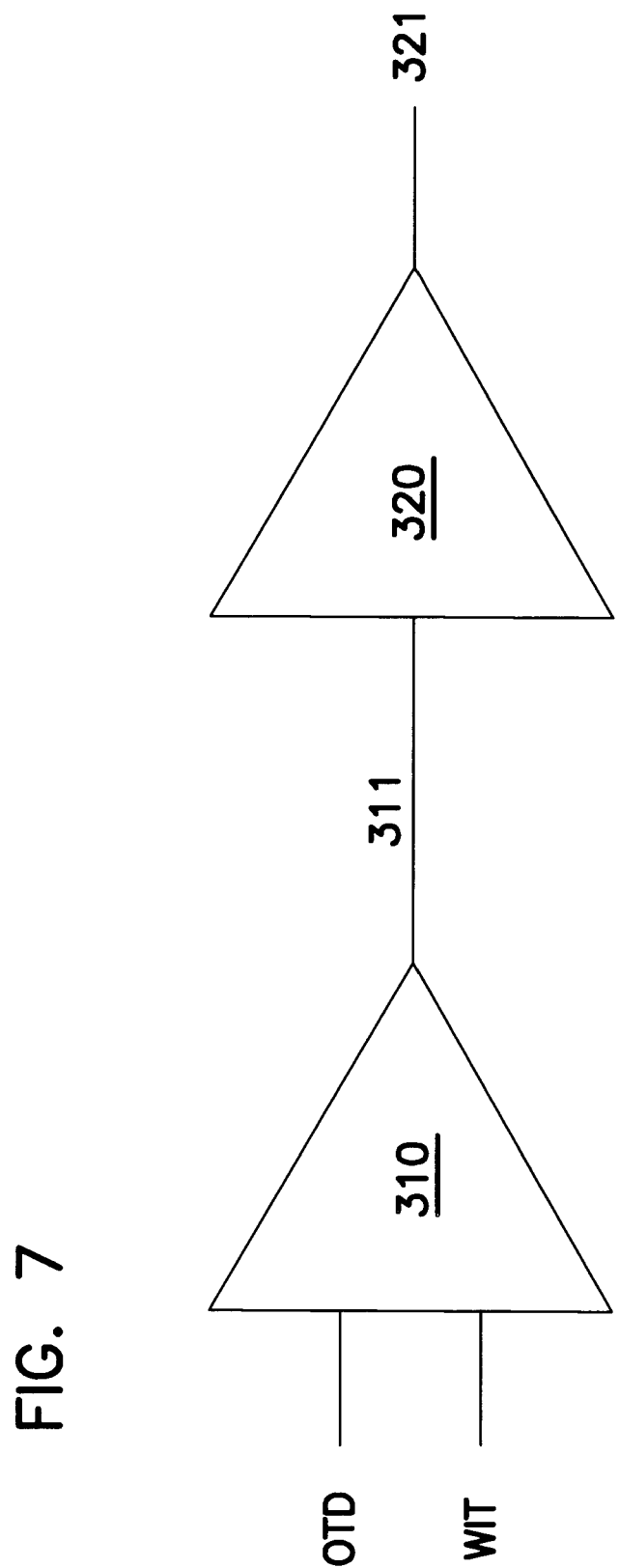

ADAPTIVE CONTROL OF A WRITE INHIBIT SIGNAL IN A DISK DRIVE BASED ON ADAPTIVE TRACK PITCH

RELATED APPLICATION

This application is related to co-pending Provisional Application Ser. No. 60/032,053, (as corrected), entitled: "ADAPTIVE CONTROL OF A WRITE INHIBIT SIGNAL IN A DISK DRIVE BASED ON ADAPTIVE TRACK PITCH", filed Nov. 25, 1996 by the same applicant.

TECHNICAL FIELD

The present invention relates to disk drive apparatus and methods of providing write inhibit instructions for reliably manipulating data on the disk drive's magnetic disk. More particularly, the present invention relates to disk drive apparatus having magnetic disk track structure and methods of providing write inhibit instructions that are based upon that magnetic disk track structure. Even more particularly, the present invention relates to disk drive apparatus having magnetic disk track structure and methods of providing write inhibit instructions that are not only based on a traditional track misregistration model but, that are also based upon the magnetic disk track structure.

BACKGROUND ART

Disk drives are apparatus comprising one or more substantially thin, magnetic disks that are rotated by a spindle motor that is responsive to the drive's control mechanism and associated electronics that communicate data via read and write heads. The disk drives are used in computer systems, such as personal computers, laptop computers and workstation equipped with computer systems, to store large amounts of data, (giga-byte range), in a form that is machine readable for subsequent use by a user. The magnetic disk comprises a surface of magnetizable material having a number of annular regions, called tracks, that extend circumferentially around the disk. Each track is divided into blocks called sectors. Data and other identification information is stored in the sectors in the form of magnetic transitions. The reading and writing of data is accomplished by read and write heads that are positioned on the required track by the drive's positioning control system. Commonly used are magneto-resistive heads having a read element and a write element, such as illustrated in FIGS. 3 and 6. Because the physical act of placing the read/write head over the required track for performing the read and write operations is not done with 100% accuracy, a track misregistration (tmr) budget is generally employed. The track misregistration budget sets a threshold for determining a distance, by example in micro-inches, by which the drive's head can go off-track prior to generating a write inhibit signal that activates the drive's write inhibit circuit that disables further read/write operations. The prior art teaches that the track misregistration budget, hence the write inhibit threshold, is based on the nominal track spacing without any consideration that the actual track spacing on the particular magnetic disk installed in the disk drive may in fact be greater, or lesser than the nominal track spacing, which is a generalized design value based on a population of disks for a particular disk drive product. The use of the nominal track spacing results in needless disk drive fallout where in fact the actual track spacing is wider than the nominal track spacing value. To applicant's knowledge disk drive write inhibit circuitry has not been enabled based on actual disk track spacing, which, if wider than a nominal design track spacing, will reduce fallout due to servo off-track conditions and decrease write inhibit events for improved disk drive performance.

Thus, a need is seen to exist for a disk drive having a write inhibit threshold that is adapted in accordance with the disk drive's actual data track spacing and which controls the generation of a write inhibit signals such that a reduction in fallout due to servo off-track conditions results, and such that a decrease in write inhibit events also result for improving a disk drive's performance.

It is therefore a primary object of the present invention to provide a disk drive having a write inhibit threshold that is adapted in accordance with the disk drive's actual data track spacing and which controls the generation of a write inhibit signals such that a reduction in fallout due to servo off-track conditions occurs, and such that a decrease in write inhibit events result for improving a disk drive's performance.

DISCLOSURE OF INVENTION

Accordingly, the foregoing objects are accomplished by providing a disk drive apparatus wherein the magnetic disks used for storing data have been manipulated such that the total space that is to be allocated for storing data has been measured and recorded such that the tracks for storing data have been servo written at a wider spacing than a nominal track spacing. The wider track spacing is utilized to determine a modified write inhibit threshold value that includes, as a minimum value, the nominal design track misregistration allowance for the disk drive. The modified write inhibit threshold value is utilized by an off-track detection circuit that activates a write inhibit signal generating circuit. By example, the disk manipulation is preferably initially conducted as a step in a manufacturing process including a manufacturing station having a host computer with a memory device and includes a precision laser instrument. The track spacing is typically expressed in micro-inch unit of measurement. The data tracks on each of the magnetic disks have been servo written utilizing the wider track spacing while maintaining the track misregistration allowance that corresponds to the nominal track spacing. During a pretest operation the recorded actual track width information is retrieved from the memory device and manipulated to determine the modified write inhibit threshold value. The modified write inhibit threshold value is written on the disk for use in generating write inhibit signals during customer utilization of the disk drive. The wider track spacing actually utilized effectively increases the off-track distance which a read/write head may travel prior to generation of a write inhibit signal. The corresponding modified write inhibit threshold value maintains this objective.

Other features of the present invention are disclosed or apparent in the section entitled: "BEST MODE FOR CARRYING OUT THE INVENTION."

BRIEF DESCRIPTION OF DRAWINGS

For fuller understanding of the present invention, reference is made to the accompanying drawing in the following detailed description of the Best Mode of Carrying Out the Present Invention. In the drawing:

FIG. 7 is a schematic illustration of a disk drive's off-track detection and write inhibit generating circuits.

Figure 1:
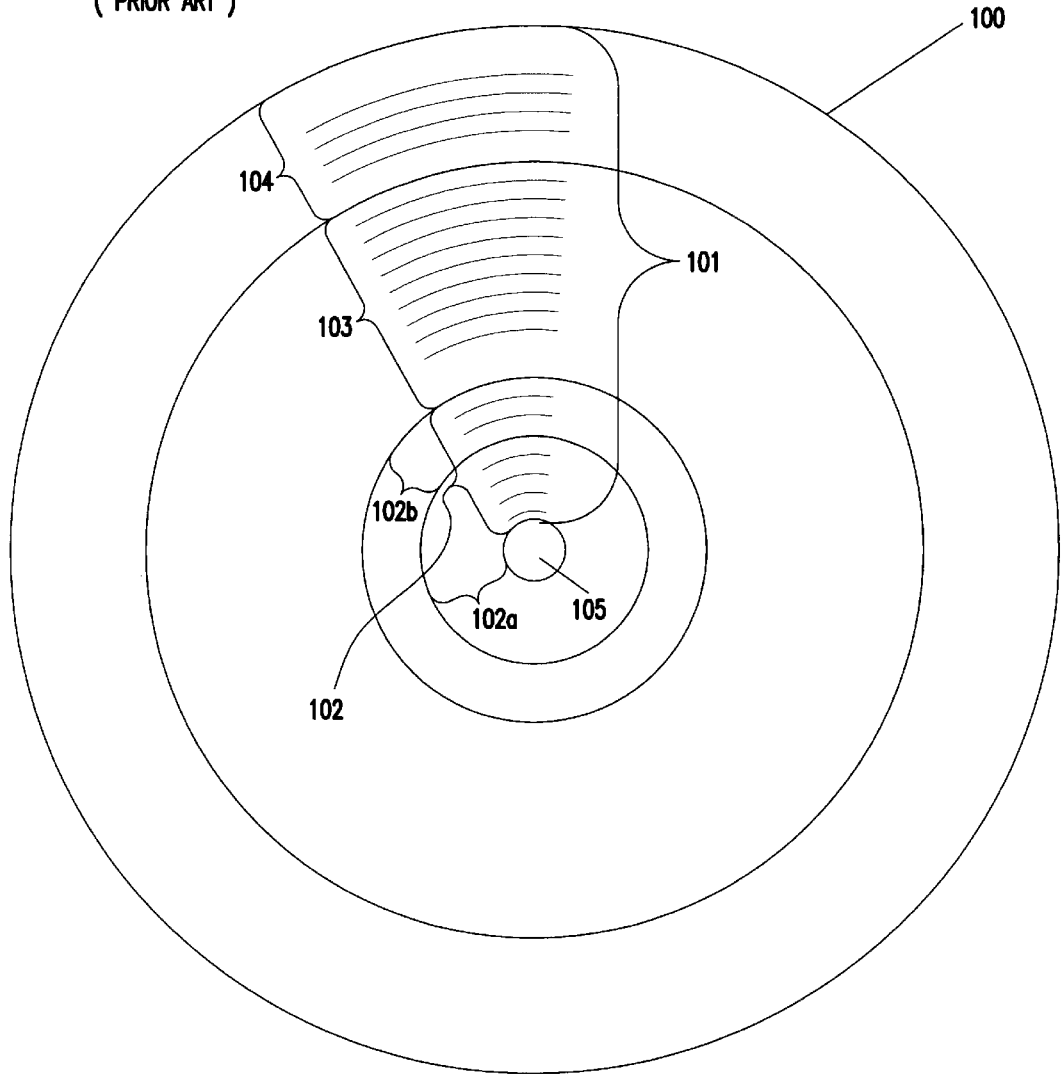
FIG. 1 is a graphical illustration of a magnetic disk used in disk drives showing the prior art allocation of disk tracks that includes the constraint of allocating extra tracks in the inner guard band to maintain drive reliability due to drive crash stop tolerances, but which impact the write inhibit threshold.

Reference numbers refer to the same or equivalent parts of the present invention throughout the several figures of the drawing.

BEST MODE FOR CARRYING OUT THE INVENTION

FIG. 1 shows a magnetic disk structure and a prior art allocation of disk tracks that includes the constraint of allocating extra tracks in the inner guard band to maintain drive reliability due to drive crash stop tolerances, but which impact the write inhibit threshold. As illustrated, magnetic disk 100 is provided having a track distribution 101 comprising an inner guard band 102, a data zone 103, and an outer guard band 104. A mounting means 105 is provided centrally located on the magnetic disk 100 for attachment to the disk drive's spindle motor. FIG. 1 further shows that inner guard band 102 is ample in space, and includes a landing zone 102a and extra tracks 102b. The prior art teaches that the track misregistration budget, hence the write inhibit threshold, is based on a design nominal track spacing associated with track distribution 101 without any consideration that the actual track spacing on the particular magnetic disk installed in the disk drive may in fact be greater, or lesser than the design nominal track spacing. The design nominal track spacing is a design value based on a population of disks for a particular disk drive product. The use of the nominal track spacing associated with track distribution 101, where in fact the actual track-to-track spacing is wider than the nominal track-to-track spacing, results in generating write inhibit signals, although within specification, at a lower threshold than the disk structure could tolerate. Design misregistration allowances are expressed as a percentage of the track-to-track spacing, by example, misregistration allowances in the range of 10–14 per cent of the track-to-track spacing are typical. Allocating extra tracks 102b within inner guard zone 102 does not provide wider track-to-track spacing in track region 103 and does nothing to improve disk drive failures that do not meet the misregistration off-track allowance, especially if a greater threshold than specified could have prevented the failure.

Figure 2:
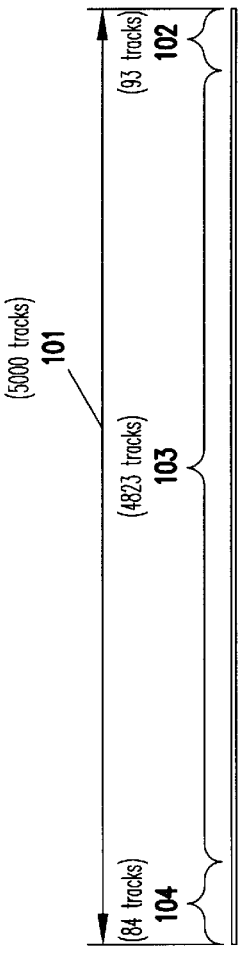
FIG. 2 is a graphical illustration of a magnetic disk's track distribution according to the prior art's use of fixed track spacing that is based on a nominal drive design point and that provides the basis for a track misregistration budget used on all drives to determine an off-track threshold value that triggers a write inhibit signal.
Figure 3:
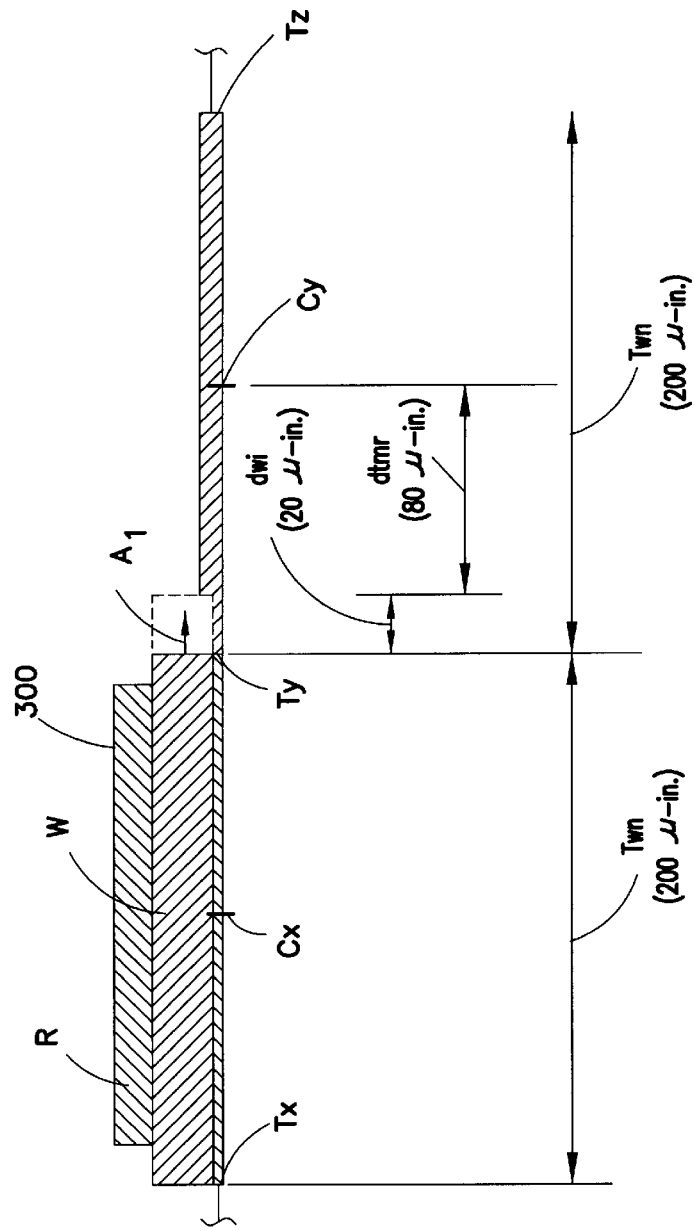
FIG. 3 is a graphical illustration of a disk drive's read write/head whose write element has a width dimension that is identical to the nominal track-to-track spacing, and directly positioned over a disk track and, also showing a maximum off-track encroachment permissible according to the track misregistration budget.

By example, FIGS. 2 and 3 further illustrates the problem solved by the present invention. Recalling that a disk drive product development effort includes the establishment of nominal track distributions and corresponding nominal track-to-track widths and track density, typically specified in micro-inches and tracks per inch, respectively, FIG. 2 shows a nominal track distribution 101 that comprises 5000 tracks where the inner guard band 102 is allocated 93 tracks, data zone 103 is allocated 4823 tracks and outer guard band 104 is allocated 84 tracks. The nominal design constraint and associated impact on write inhibit signal generation is further exemplified in FIG. 3. As illustrated, a nominal track density of 5000 tracks per inch results in nominal track-to-track width Twn of 200 micro-inches, shown by example, as the spacing between tracks Tx, Ty and Tz., which technically delineate the end of one track and the beginning of the other. As shown in FIG. 3, a disk drive's read/write head 300 having a read element R and a write element W also having a width dimension of 200 micro-inches, is shown positioned directly over track center Cx of the spacing between tracks Tx and Ty. A misregistration allowance of 10% of the track width results in a write inhibit distance dwi threshold of 20 micro-inches into the adjacent track spacing, as indicated by encroachment arrow A1. For the particular track spacing of 200 micro-inches shown in FIG. 3, a product specification would specify a maximum encroachment distance dtmr of 80 micro-inches from the adjacent track center Cy. The permissible encroachment distance from an adjacent track's center being a controlling measure for generation of a write inhibit signal and determinative of the specification of a write inhibit threshold value, such as write inhibit distance dwi. Thus, the write inhibit threshold value is an off-track encroachment specification value that, upon being exceeded during a write operation being performed by a write head member, the disk drive apparatus will inhibit further writing operations. The write inhibit threshold, and thus the off-track encroachment specification value, is based on track width.

Figure 4:
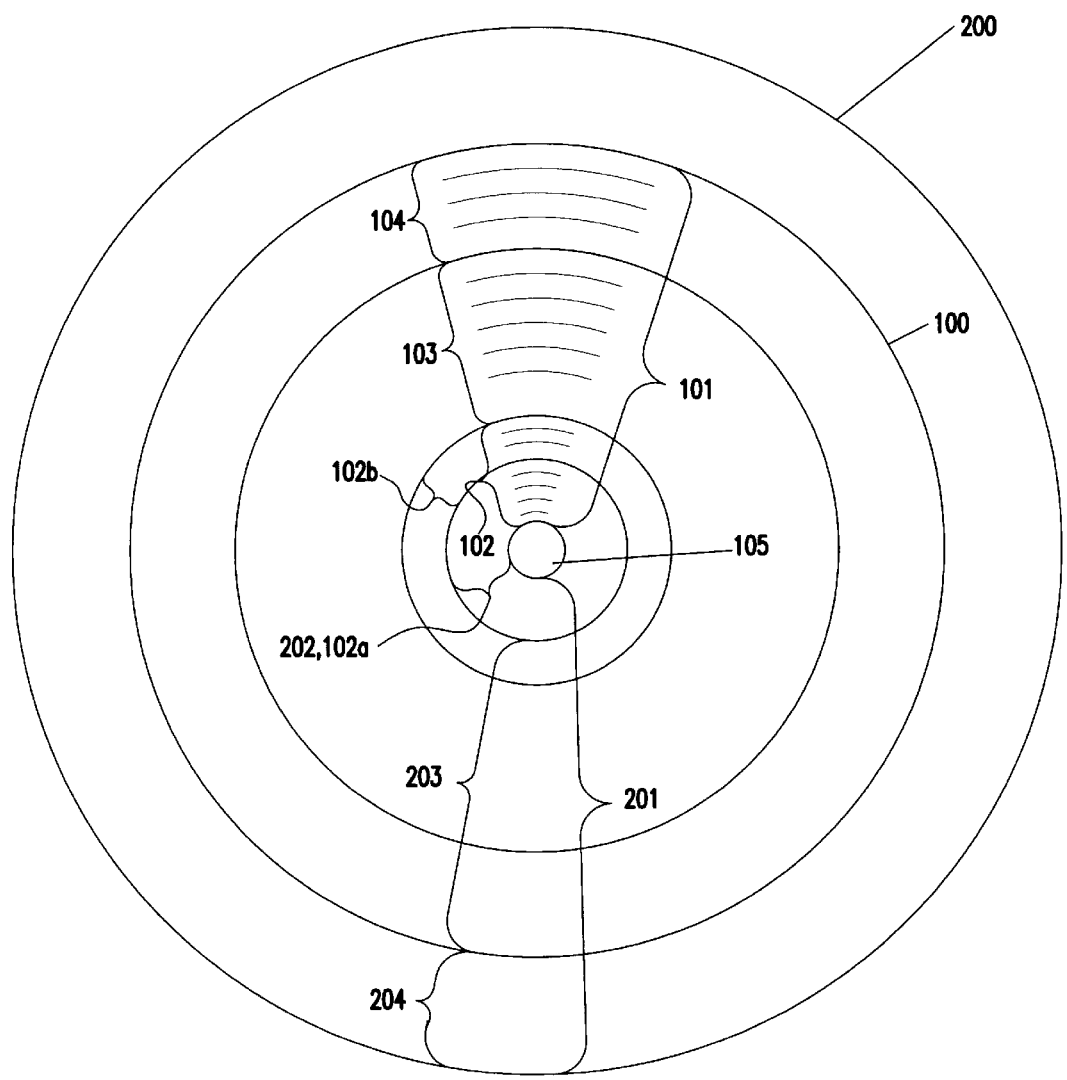
FIG. 4 is a graphical illustration of a magnetic disk used in disk drives showing the allocation of disk tracks in accordance with the present invention that now includes adaptive allocation of extra tracks to the data zone track area.

The present invention capitalizes on the reality that on some magnetic disks the spacing for storing data may be greater than the nominal disk spacing normally used to write data. FIG. 4 illustrates magnetic disk 100 that has had its track pitch adaptively controlled such that a larger magnetic disk 200 with a greater area for writing data is effectively available. As illustrated, magnetic disk 100, having been adaptively controlled with regards to track density, actually contains a larger track distribution region 201 than nominal track distribution 101. The difference between disk 100 shown in FIG. 1 and disk 200 shown in FIG. 4 is that by actual measurement the extra space 102b that was allocated to inner guard band 102 is now allocated to data zone 203 to create more space than allocated by using nominal data zone 103. It should be noted that inner guard band 202 in FIG. 4 comprises the same quantity of tracks as in landing zone 102a. The difference being that the tracks in the region 202, 102a in FIG. 4 are spaced apart, and servo written, at a wider distance than the tracks in region 102a in FIG. 1. Similarly, outer guard band region 204 comprises the same quantity of tracks as in outer guard band 104 but differs in that the tracks in region 204 in FIG. 4 are spaced apart at a wider distance than the tracks in region 104 as shown in FIG. 1.

Figure 5:
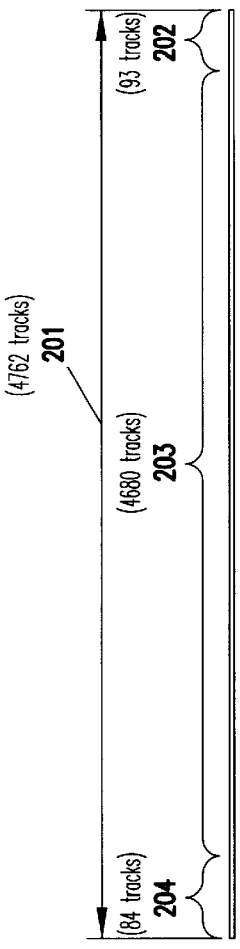
FIG. 5 is a graphical illustration of a magnetic disk's track distribution in accordance with the present invention wherein track spacing is based on actual measurement of disk space that is available for recording data.
Figure 6:
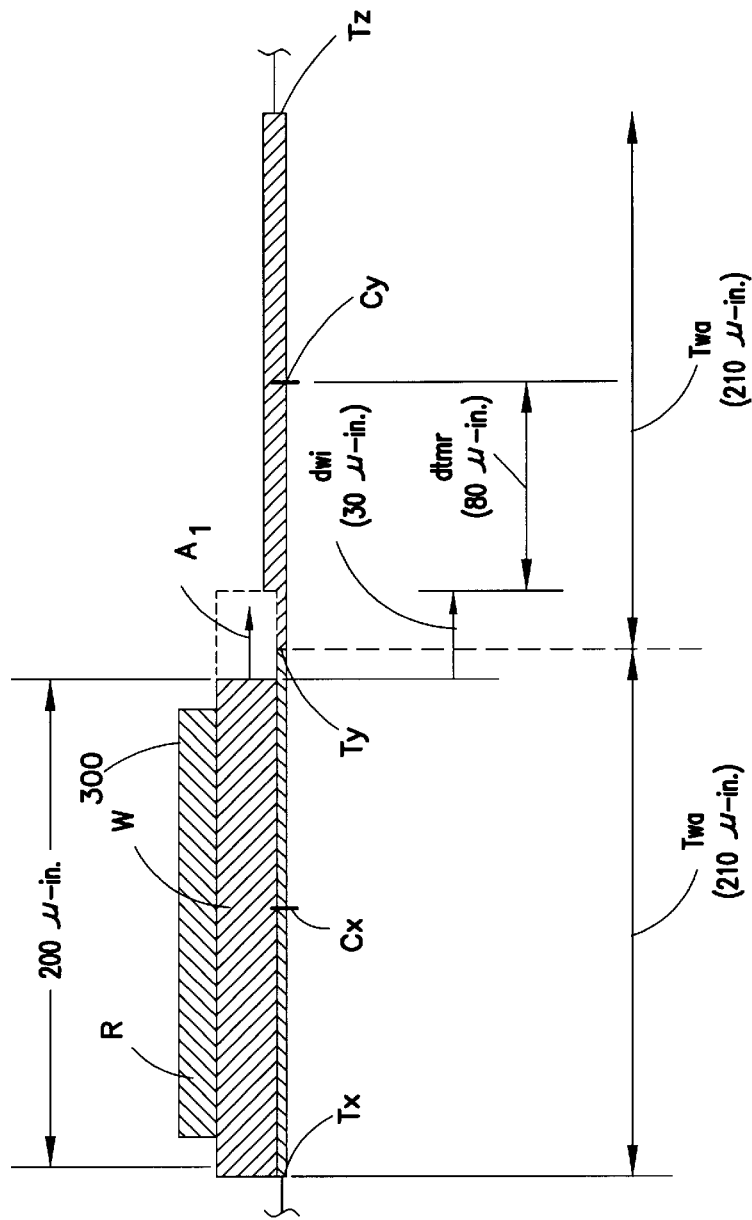
FIG. 6 is a graphical illustration of a disk drive's read/write head having a write element with a width dimension that is the same as in FIG. 3 and shown being centrally positioned over a track having a greater width as determined by measurement, and also showing a corresponding greater off-track encroachment distance made possible by the wider track spacing, yet still being within the drive's track misregistration allowance.

The advantage of utilizing a disk's actual area for storing data has been found to increase the track-to-track width from 1% to less than 10%. FIG. 5 and 6 show, by example, a track-to-track width increase of 5%, while maintaining the same storage capacity. However, as FIG. 5 illustrates, instead of having to crowd 5000 tracks as was done in space 101, only 4762 track need to be written in the space delineated as 201. The allocation of the 4762 tracks is done such that the data zone 203 has less track density, while inner guard zone 202 and outer guard zone 204 can have the same number of tracks as before, but at the wider spacing. Thus, track region 202 has 93 tracks, track region 203 has 4680 and track region 204 has 84 tracks. During the manufacturing process a servo writer writes and records the actual track pitch data for later use during the disk drive manufacturing process. The actual track pitch data for a disk is accessed during a testing step of the disk drive apparatus. During this testing step the write inhibit threshold value is modified in accordance with the actual track spacing that has been previously determined for the disk drive being tested. FIG. 6 illustrates the impact on the write inhibit threshold value by a track-to-track width increase of 5% on a disk having a nominal track-to-track width of 200 micro-inches. As depicted, tracks Tx, Ty, and Tz are now spaced apart by an adaptive track width Twa of 210 micro-inches. If the track misregistration model is based on nominal values, an encroachment to within a distance dtmr of 80 micro-inches of track center, by example track center Cy, is allowable. Thus, a 200 micro-inch wide write head W, when centrally positioned about track center Cx, can now move a write inhibit distance dwi of up to 30 micro-inches in the direction depicted by encroachment arrow A1 before enabling a write inhibit signal. The 10 micro-inches includes 5 micro-inches gained from each 210 micro-inch track spacing. The write inhibit threshold value is adaptively modified for each drive and would be based on the actual track pitch that was adaptively controlled during the disk drive manufacturing process. The modification of the write inhibit threshold would be bounded in accordance with a track misregistration budget for nominally spaced disk drives, but is now increased in accordance with the actual track width on the disk storage member. Higher manufacturing disk drive yields and lower product cost are facilitated by the relaxing the constraints on the write inhibit margins.

FIG. 7 depicts how a write inhibit threshold (WIT) can be used to generate a write inhibit signal 321 consistent with the present invention. Off-track detection circuit 310 receives signals repesentative of the write inhibit threshold value (WIT) and of the off-track deviation (OTD) of a head member 300. If OTD exceeds WIT, off-track detection circuit 310 generates an off-track signal 311 to the write inhibit generation circuit 320, which then generates a write inhibit signal 321.

The present invention has been particularly shown and described with respect to certain preferred embodiments and features thereof. However, it should be readily apparent to those of ordinary skill in the art that various changes and modifications in form and detail may be made without departing from the spirit and scope of the inventions as set forth in the appended claims. The inventions illustratively disclosed herein may be practiced without any element which is not specifically disclosed herein.

I claim:

1. A disk drive apparatus, said apparatus comprising:
   (a) at least one magnetic disk storage member, said disk storage member having many data tracks disposed in a circular pattern on said disk, said data tracks having an actual track pitch greater than a predetermined nominal design track pitch for said magnetic disk storage member;
   (b) at least one write head member;
   (c) an off-track detection circuit to track the position of said write head member to generate an off-track deviation (OTD) signal to provide an off-track signal when said OTD signal exceeds a write inhibit threshold (WIT) value, said WIT value derived from a size measurement performed on said at least one disk storage member; and
   (d) a write inhibit signal generation circuit responsive to said off-track signal to generate a write inhibit signal.

2. A disk drive apparatus as described in claim 1, wherein: said WIT value being proportional to an aggregation of a nominal design misregistration percentage allowance with a percentage increase in track pitch beyond a predetermined nominal design track pitch.

3. A disk drive apparatus as described in claim 1, wherein: said actual track pitch being at least 1.01 times greater than said predetermined nominal design track pitch.

4. A disk drive apparatus as described in claim 3, wherein: said size measurement is a track width measurement.

5. A disk drive apparatus according to claim 1, in which size-related data is recorded on said at least one magnetic disk storage member, said recorded data derived from said size measurement performed on said storage member, said WIT value derived from said recorded data.

6. A disk drive apparatus according to claim 5, in which said pattern comprises a servo pattern containing said size-related recorded data.

7. A disk drive apparatus according to claim 5, in which said WIT value is proportional to an aggregation of a nominal design misregistration percentage allowance with a percentage increase in track pitch beyond a predetermined nominal design track pitch, said actual track pitch being 1.01 to 1.10 times greater than said predetermined nominal design track pitch, said size measurement being a track width measurement, said circular pattern comprising a servo pattern containing said size-related recorded data, said size-related recorded data comprising said WIT value.

8. A disk drive apparatus according to claim 5, in which said size-related recorded data comprises said WIT value.

9. A method of controlling generation of a write inhibit signal by a disk drive apparatus, said method comprising the steps of:
   (a) providing a disk drive apparatus having at least one magnetic disk storage member, a write inhibit signal generating circuit, and an off-track detection circuit;
   (b) measuring said disk storage member and determining an actual track width for spacing a plurality of data tracks on said at least one magnetic disk storage member in a circular pattern;
   (c) controlling a track width spacing during a servo writing operation by writing data on a said plurality of data tracks in a spaced apart circular pattern such that said plurality of tracks are spaced apart by said determined actual track width;
   (d) deriving a write inhibit threshold value from said actual track width;
   (e) providing said determined write inhibit threshold value and an off-track deviation to said off-track detection circuit;
   (f) generating an off-track signal from said off-track detection circuit responsive to said off-track deviation exceeding said write inhibit threshold value; and
   (g) generating said write inhibit signal from said write inhibit signal generating circuit, said write inhibit signal responsive to said off-track signal.

10. A method of controlling a write inhibit signal in a disk drive apparatus as described in claim 9, wherein:

said step of deriving said write inhibit threshold value comprises aggregating a nominal design misregistration percentage allowance with a percentage increase in a track beyond a predetermined nominal design track width.

11. A method of controlling a write inhibit signal in a disk drive apparatus as described in claim 9, wherein:

said step of measuring comprises utilizing a laser to determine said actual track width.

12. A method of controlling generation of a write inhibit signal by a disk drive apparatus, said method comprising the steps of:

(a) providing at a manufacturing station a disk drive apparatus having at least one magnetic disk storage member, at least one write head member, a write inhibit signal generating circuit, and an off-track detection circuit, said station comprising a host computer member including a memory device and a precision measurement instrument;

(b) measuring said disk storage member using said precision measurement instrument and determining an actual track width for spacing a plurality of data tracks on said at least one magnetic disk storage member in a circular pattern;

(c) storing said determined actual track width in said memory device (d) controlling a track width spacing during a servo writing operation by writing data on said plurality of data tracks in a spaced apart circular pattern such that said plurality of tracks are spaced apart by said determined actual track width;

(e) retrieving said stored actual track width from said memory device and determining a write inhibit threshold value, said write inhibit threshold value being a dimension based on a percentage of said actual track width.

(f) controlling generation of a write inhibit signal by writing, on said plurality of data tracks, said determined write inhibit threshold value;

(g) detecting an off-track deviation by said at least one write head member that exceeds said written write inhibit threshold value; and (h) generating a write inhibit signal in response to said step of detecting.

13. A method of controlling a write inhibit signal in a disk drive apparatus as described in claim 12, wherein:

said step of determining said write inhibit value comprises determining said percentage as an aggregation of a nominal design misregistration percentage allowance with a percentage increase in track width beyond a predetermined nominal design track width.

14. A method of controlling a write inhibit signal in a disk drive apparatus as described in claim 13, wherein:

said aggregation comprises a percentage in a range of 12 to 20 percent.

15. A method of controlling a write inhibit signal in a disk drive apparatus as described in claim 12, wherein:

said step of measuring comprises measuring said disk storage member utilizing a laser and determining said actual track width in micro-inches.

* * * * *